United States Patent [19]

Sachdev et al.

[11] Patent Number: 4,550,061

[45] Date of Patent: Oct. 29, 1985

[54] ELECTROEROSION PRINTING MEDIA USING DEPOLYMERIZABLE POLYMER COATINGS

[75] Inventors: Krishna G. Sachdev, Wappingers Falls; Stephen A. Shear, Rosendale; Keith S. Pennington, Somers; Mitchell S. Cohen, Ossining, all of N.Y.

[73] Assignee: International Business Machines Corporation, Armonk, N.Y.

[21] Appl. No.: 599,875

[22] Filed: Apr. 13, 1984

[51] Int. Cl.[4] ........................ B32B 15/08; B32B 27/06; B32B 27/08

[52] U.S. Cl. ........................................ 428/461; 204/2; 427/58; 427/388.2; 428/421; 428/422; 428/463; 428/522; 428/913

[58] Field of Search ............... 428/469, 421, 514, 422, 428/212, 461, 463, 522, 419, 913; 427/121, 58, 388.2; 346/135.1; 204/2

[56] References Cited

U.S. PATENT DOCUMENTS 2,983,220 5/1961 Dalton et al. .................. 428/514 X
3,048,515 8/1962 Dalton ............................ 428/212 X
3,138,547 6/1964 Clark ............................... 427/121 X
3,242,075 3/1966 Hunter ........................ 427/388.2 X
3,411,948 11/1968 Reis .................................... 428/469
3,514,325 5/1970 Davis et al. ...................... 346/135.1
4,339,758 7/1982 Bhatia et al. ................. 346/135.1 X
4,400,706 8/1983 Takemura et al. ............... 346/135.1

*Primary Examiner*—Thomas J. Herbert
*Attorney, Agent, or Firm*—Jackson E. Stanland

[57] ABSTRACT

Improved electroerosion recording media are described in which ablatable polymers are used in the electroerosion recording medium. This medium includes at least a substrate or support layer, a base layer which protects the substrate, a thin film of conductive material on the base layer and which can be eroded, and a protective overcoat layer. Ablatable polymers are used as binders in either the base layer or the top protective layer, or both, in order to provide advantages during electroerosion. These ablatable polymers undergo thermally induced depolymerization in such a way that the result is the formation of volatile monomeric or low molecular weight species as the predominant products, with little or no adherent residue.

20 Claims, 6 Drawing Figures

ELECTROEROSION PRINTING MEDIA USING DEPOLYMERIZABLE POLYMER COATINGS

DESCRIPTION

1. Field of the Invention

This invention relates to electroerosion recording, and more particularly to recording materials useful in electroerosion recording, where depolymerizable polymers are used having ablative characteristics in order to provide overall performance improvement and reduced polymeric residue formation.

2. Background Art

Electroerosion recording is a well-known technique for producing various markings, such as letters, numbers symbols, patterns such as circuit patterns, etc. on a recording medium in response to an electrical signal. The electrical signal removes, or erodes, material from the recording medium as a result of spark initiation. Typically, the material which is removed from the recording medium is a conductive layer that is vaporized in response to localized heating associated with sparking.

The recording medium which has a portion thereof eroded away due to the electrical arcing can be used as an offset master or as a direct negative, depending upon the system applications. References generally relating to electroerosion recording include U.S. Pat. Nos. 2,983,220 (Dalton et al); 3,048,515 (Dalton); 2,554,017 (Dalton); 3,138,547 (Clark); and 3,411,948 (Reis).

The electroerosion recording medium at its minimum is comprised of a support layer and a thin film of conductive material which is vaporized in response to the electrical sparking. The support layer, or substrate, can be comprised of many different materials, such as Mylar (a trademark of E. I. duPont deNemours), or some other polymeric material. The substrate thickness is not critical, and is typically in the range of about 50-125 micrometers. The thin conductive layer which is eroded to provide patterns or markings therein is typically a vacuum evaporated or sputtered layer of aluminum having a thickness of about 100-500 Å. The thickness of this conductive layer is measured by its resistance per square unit area, and is preferably in the range of approximately 1-5 ohm per square. This provides clean vaporization and erosion of the aluminum when it is locally heated by applying an electric voltage to an electrode in contact with the surface of the recording medium.

Electroerosion recording is achieved by moving a stylus or a plurality of styli relative to the surface of the recording medium. Electrical writing signals are fed to the stylus to provide controlled electrical pulses that generate sparks at the surface of the recording medium. This heats and removes by evaporation selected portions of the conductive layer. The locations from which the conductive material is removed correspond to the indicia or images which are to be recorded. In the course of electroerosion recording, the stylus is moved relative to the surface of the recording medium and in contact with the conductive layer to be electroeroded.

In an actual recording system there may be as many as 30 or more different styli arranged to provide a pattern of printing, one line at a time, and with considerable definition. A writing control directs pulses of voltage to individual styli. These pulses are at a level sufficient to cause arcing and evaporation of the layer of conductive material in order to record the desired pattern of information.

In electroerosion recording, considerable mechanical scratching (i.e., undesired removal of the conductive layer) often occurs, due to the fragile nature of the tin conductive layer and to variations in stylus pressure. This scratching occurs when no writing signal is present, and is particularly troublesome in high speed, high resolution electroerosion recording. The scratching is purely mechanical and non-electrical in nature, and results in unwanted removal of the conducting metal layer by the abrasive action of the styli. For this reason, a lubricant and/or protective overlayer on the surface of the conductive layer has been used to reduce the scratching effects of the styli. These overlayers are usually polymer binders with a solid lubricant, such as graphite, molydisulfide, boron nitride, $CaF_2$, $MgF_2$, tungsten sulfide, etc. When graphite is used, it is typically present in an amount 50-80%, by weight. The protective overlayer, or overcoat, is usually about 100-500 Å in thickness. A lubricant-protective overcoat layer employing a polymeric organic binder with a high proportion of solid lubricant filler, such as graphite, is described in copending U.S. patent application Ser. No. 454,744, filed Dec. 30, 1982 by M. S. Cohen.

Another known improvement in electroerosion recording media is the use of an intermediate layer, often termed a base layer, between the supporting substrate and the conductive material layer. This intermediate layer is generally a polymer layer having particulates in it for better printing. The particulates include glasses, silica, $CaCo_3$, $TiO_2$, and $ZnO_2$. These base layers are relatively hard (having a Knoop hardness in the range of 20-30) and protect the underlying substrate support from plastic deformation during printing. The thickness of the base layer is typically 5-7 micrometers. A representative base layer is one formed of a cross-linked polymer in accordance with the teachings of copending U.S. patent application Ser. No. 454,743, filed Dec. 30, 1982 by M. S. Cohen et al, now abandoned, and as signed to the present assignee.

During electroerosion, the interface between the intermediate base layer and the thin conductive layer participates in the electroerosion. If the polymeric base layer degrades such that sticky residues are left, these organic insulator residues may be coated on the stylus and reduce the amount of electrical current through the stylus. The adherent organic residue particles can also arise from the overcoat layer but, because that layer is thin and primarily comprised of a lubricant such as graphite, the major contribution to this stylus-fouling problem is the intermediate layer located between the thin conductive layer and the support substrate. In particular, many types of cellulosic polymers tend to leave black, sticky residues upon electroerosion.

In addition to the fouling problem described above, problems such as slow outgassing can occur during electroerosion. This can produce unpleasant or even toxic fumes.

In general, the intermediate layer must provide a hard, abrasion-resistant coating in order to prevent plastic deformation of the support layer during electroerosion printing. Improved print quality and reduction in writing energy will occur if the intermediate layer does not adversely affect the evaporation, or removal, of the conductive layer. At the same time, the intermediate layer should provide good adhesion and resistance against corrosion and protection against possible damage of the thin conductive layer, during storage and handling.

Accordingly, it is a primary object of the present invention to provide improved materials for use in electroerosion recording media, and in particular to provide improved intermediate layers and overlayers for use in these media.

It is another object of the present invention to provide improved materials for use in electroerosion recording media, which materials will allow clean electroerosion recording to occur without undesired accumulation of eroded debris on the print head.

It is another object of the present invention to provide an improved electroerosion recording medium in which fouling of the electrode styli is reduced.

It is another object of the present invention to provide an improved electroerosion recording medium in which the presence of sticky residues and adverse fumes is minimized during electroerosion recording.

It is another object of this invention to provide improved materials for use in the overcoat layer and the intermediate layer of an electroerosion recording medium, where removal of the overcoat and participation of the intermediate layer during the printing process does not produce sticky residues or byproducts that are toxic or which cause fouling and/or other problems.

It is a further object of this invention to provide an improved material for an intermediate layer located between a conductive layer and a support layer of an electroerosion recording medium, where separation-/erosion of the thin conductive layer from the intermediate layer is facilitated during electroerosion.

It is a still further object of the present invention to provide improved materials for use in overlayers and intermediate layers in electroerosion recording media, where the use of these improved materials leads to electroerosion with reduced fouling problems.

DISCLOSURE OF INVENTION

In the practice of this invention, improved materials are described for use as binders in the intermediate base layer and/or in the protective overlayer. These improved materials provide hard, abrasion resistant coatings and are characterized by a high glass transition temperature $T_g$($T_g$> 100° C.).

They undergo thermally-induced main-chain scission to monomeric or low molecular weight species with little or no residue. These materials are thermally depolymerizable and have ablatable characteristics which make them superior for use in electroerosion recording media. While they are normally used as binders in the intermediate layer and in the protective overlayer, it is also possible to use a thin layer comprised of these ablative materials between the thin conductive layer and the intermediate layer. These materials can also be employed as granulates in other intermediate layer formulations, such as those presently known, to provide improved electroerosion recording.

Polymers suitable for use in the practice of this invention include the following:

1. Polmyers derived from α-substituted acrylate monomers as represented by the following structure

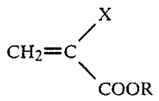

where

X=$-CH_3$, $-CF_3$, $-C_2H_5$, $-C_6H_5$,

R=$-H$, $-CH_3$, $-CH_2CH_2CH_2CF_3$, $-CH_2C_6H_5$, $-C_2H_5$

2. α-Substituted styrene polymers, such as poly α-methyl styrene and poly α,β,β,-trifluorostyrene 3. Polymers derived from vinyl ketone monomers as represented by the following structural formula

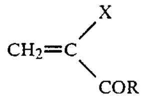

where

X=$-CH_3$, $-C_6H_5$, $-CH_2CH_3$

R=$-CH_3$, $-CH_2CH_3$, $-C_6H_5$

4. Polyoxymethylene $-(CH_2-O)_n$

These materials may be used as single components or in combination as binder systems for fillers including $SiO_2$, ZnO, carbon black, graphite, $TiO_2$, $Al_2O_3$, etc. These ablative polymers are characterized by a relatively sharp decrease in weight due to loss through volatization of the thermal decomposition products within a narrow temperature range.

These and other objects, features, and advantages will be apparent from the following more particular description of the preferred embodiments.

BEST MODE FOR CARRYING OUT THE INVENTION

This invention relates generally to materials which can be used in electroerosion recording media, and particularly to the application of pigment-filled polymer layers having ablative characteristics under the conditions of electric arcs during the recording operation. These ablatable materials provide reduced polymeric residue formation and an overall performance improvement. They can be used in the intermediate layer located between the thin conductive layer to be eroded and the support (i.e. substrate layer), and can also be used in the overlayer which serves as a lubricant and protective layer for the thin conductive layer.

Figure 1:
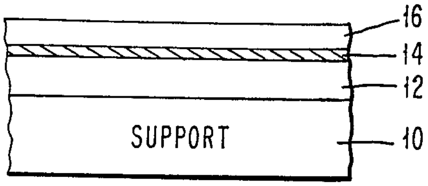
FIG. 1 shows an electroerosion recording medium including the ablatable polymers of this invention in the intermediate layer and/or protective layer.
Figure 2:
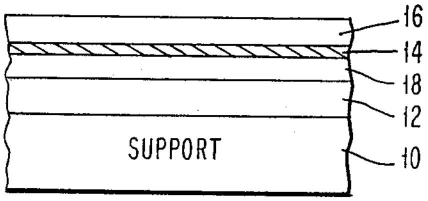
FIG. 2 schematically represents an electroerosion recording medium, in which an additional layer 18 comprising the ablatable polymers of the present invention is used between the thin conductive layer and the intermediate layer.
Figure 3:
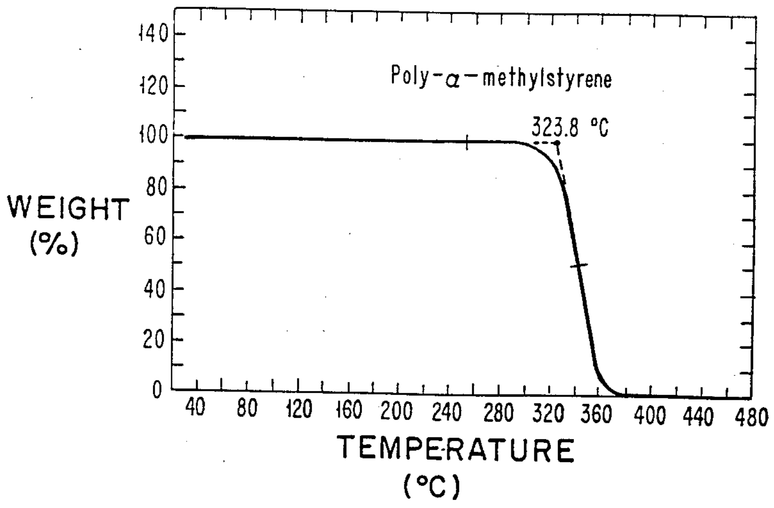
FIGS. 3-6 are thermogravimetric analysis (TGA) thermograms plotting weight versus temperature for four representative ablatable polymers which can be used in the present invention.

FIGS. 1 and 2 schematically represent examples of electroerosion recording media of a type well known in the art. In FIG. 1, the support or substrate layer 10, typically comprised of Mylar (a trademark of Dupont)

has a base (i.e., intermediate) layer 12 thereon. The next layer 14 is a thin layer of conductive material, such as aluminum, which can be eroded when an electrode is brought close to the recording medium. Located over layer 14 is a lubricant/protective layer 16. The functions of layers 10–16, and their typical dimensions, have been described previously and will not be repeated here.

FIG. 2 shows another embodiment of a recording medium, also being comprised of the support layer 10, the base layer 12, the thin erodable layer 14, and the protective layer 16. FIG. 2 differs from FIG. 1 in that an additional layer 18 is provided between the thin conductive layer 14 and the base layer 12. As will be apparent later, the layer 18 can be comprised of the ablatable materials described in the present invention. Layer 18 will aid in the erosion of the layer 14 as it will separate easily from layer 14. Layer 18 will also shield base layer 12 during electroerosion, to minimize the formation of residues, if layer 12 is not comprised of the ablatable materials of the present invention.

In FIGS. 1 and 2, the ablatable materials of this invention can be used in the base layer 12, in the protective layer 16, and also in the separate layer 18. The final structure of the electroerosion medium can include all three layers 12, 16 and 18, any suitable combination of two of these layers, only layer 12, or only layer 16, in accordance with design requirements. These ablatable materials can be used as binders, or can be combined with other binder materials. However, the advantages described previously are maximized when the ablatable materials of the present invention provide the entire binder function. Modified coating compositions with respect to these binders can be formed by incorporation of suitable plastisizers such as phosphoric acid esters, phthalic acid esters or fatty acid esters.

In this invention, the polymer component of the base layer, separate layer, and/or protective layer is comprised of a material that undergoes thermally-induced depolymerization through main-chain scission by relatively uncomplicated reaction pathways, resulting in the formation of volatile monomeric or low molecular weight species as the predominant products, with little or no adherent residue. The mode of decomposition is such that radicals can't recombine to form ligomers. The use of these materials leads to improved characteristics in terms of film properties, adhesion to the thin conductive layer 14 and to the plastic support layer 10, and also provides facile erosion of the thin conductive layer 14. The use of these materials also minimizes the problem of organic residue formation on the electrode printhead. As another advantage, it has been found that coating compositions containing such polymeric binders for lubricants such as graphite can be applied as thin protective layers that are highly adherent to the thin conductive layer 14 with no problem of flake-off during handling or storage.

During the electroerosion printing process, a high local temperature in the imaging area causes depolymerization of these binders to monomers or low molecular weight species which volatilize causing local destruction of the polymer matrix, with consequent deformation and adhesion failure at the interface of base layer 12 and conductive layer 14. This provides enhanced facile removal of the metal comprising layer 14 and may lead to less energy for recording.

While these materials are characterized by minimum residue (less than 2%) after decomposition according to thermogravimetric analysis carried out in nitrogen, they also decompose in a manner that will not lead to sticky byproducts which would adhere to the printing head in the electroerosion process.

Thus, the ablatable materials suitable for use in the present invention are those which begin decomposing with a sharp, thermally-induced onset of decomposition and thereafter decompose rapidly to essentially zero residue. They should also undergo no slow outgassing of toxic or sticky byproducts which might adhere to the electrostylii. Further, they should burn cleanly at temperatures less than or the same as that necessary for electroerosion, and the products formed during decomposition of these polymers should be monomeric and low weight, or combustion products such as $CO_2$ and $H_2O$.

Ablatable polymers which will provide these advantages are described in more detail as follows:

1. Polymers derived from α-substituted acrylate monomers as represented by the structure

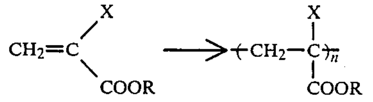

MONOMER POLYMER where

X = $-CH_3$, $-CF_3$, $-C_2H_5$, $-C_6H_5$

R = $-H$, $-CH_3$, $-CH_2CH_2CH_2CF_3$, $-C_6H_5$, $-CH_2C_6H_5$, $-C_2H_5$

Examples of polymers having this structure include

Polymethylmethacrylate (PMMA)
Polymethyltrifluoromethacrylate
Polyfluorobutylmethacrylate
Polyethylmethacrylate
Polymethacrylic acid
Polymethacrylic anhydride
Methylmethacrylate-Methacrylic anhydride copolymer
Methylmethacrylate-Methacrylic acid copolymer
Polyphenylmethacrylate.

2. α-Substituted Styrene Polymers a. Polymers derived from styrene monomers given by the following structural formula:

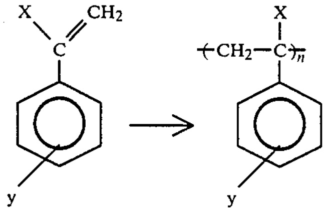

MONOMER POLYMER where

X = $-CH_3$, $-C_2H_5$, $-F$, $-CF_3$ y = $-H$, $-CH_3$, $-C_2H_5$, $-OCH_3$, $-OC_2H_5$, $-COOR$ (R = $-CH_3$, $-C_2H_5$)

b. Styrene Polymers having the following structural features:

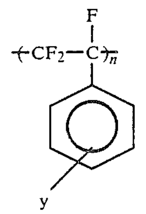

where y=—H, $-CH_3$, $-C_2H_5$ c. Copolymers derived from α-substituted styrenes and α-Substituted acrylates represented by the following structure:

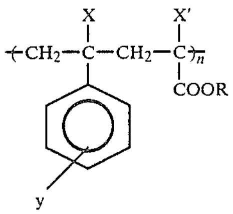

where

X and X'=$-CF_3$, $-CH_3$, $-C_2H_5$, y=—H, $-CH_3$, $-C_2H_5$, $-OC_2H_5$

R=$-CH_3$, $-C_2H_5$, $-C_6H_5$

3. Polymers derived from vinyl ketone monomers given by the following structural formula:

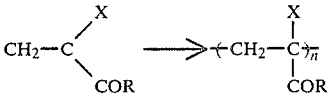

MONOMER POLYMER where

X=$-CH_3$, $-C_6H_5$, $-CH_2CH_3$

R=$-CH_3$, $-CH_2CH_3$, $-C_6H_5$

An example is polymethylisopropenyl ketone

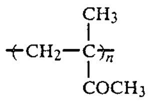

derived from the monomer where X=R=$CH_3$.

4. Polyoxymethylene: $-(CH_2-O)_n$

These ablatable polymer materials may be used as single components or in combination as binder systems for fillers including $SiO_2$, ZnO, carbon black, graphite, $TiO_2$, $Al_2O_3$, etc. That is, these materials may include any of the fillers which are customarily put into the base layer 12 and the protective layer 16.

For example, typical base layer 12 compositions contain 70–90% organic binder and flexing agent, and 10–30%, by weight, of roughening agent, such as $SiO_2$. These base layers are coated on the support layer 10 to a dry thickness of approximately 3–6 micrometers. On the base layer can be deposited a thin film of conductive material, such as Al, at a thickness of about 250–400 Å. The conductive layer deposition is usually by vacuum evaporation or sputtering. Conductive layer 14 can then be overcoated (optional) with a thin lubricant protective layer 16. Layer 16 can include a graphite dispersion in the ablatable polymeric binders described above, in order to provide lubrication and scratch resistance.

During electroerosion recording, these materials will thermally decompose. This occurs primarily by a depolymerization mechanism involving free radicals. Thermal decomposition of two examples (polymethylmethacrylate and poly α-methylstyrene), which do not leave a charred residue, are shown here:

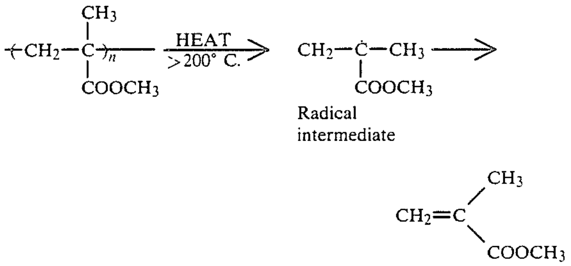

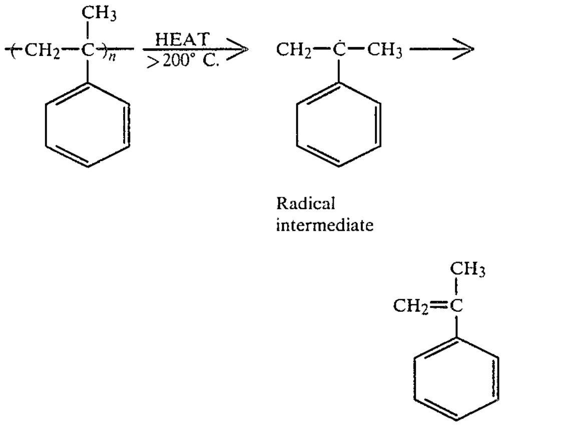

These thermal decomposition reactions, and others, are described in the following:

H. H. G. Jellinek, Ed. "Aspects of Degradation and Stabilization of Polymers", Elsevier, 1978

N. Grassie, Ed. "Developments in Polymer Degradation—I, Applied Science Publishers, 1977

Thermal Profiles

(FIGS. 3–6)

FIGS. 3–6 show the thermal profiles of four representative ablatable polymers in accordance with the present invention. These thermal profiles were prepared by thermogravimetric analysis carried out in a nitrogen atmosphere in the temperature range 25°–600° C. at a constant heating rate of 20°/min.

The thermogravimetric analysis (TGA) curves of these materials are characterized by a relatively sharp decrease in weight due to loss through volatilization of the thermal decomposition products within a narrow temperature range. For example, the thermal analysis of poly-α-methylstyrene (FIG. 3) with low to high molecular weight ($\overline{MW}$=20K–500K), shows an onset temperature for the decomposition of about 300° C., the temperature of 50% weight loss is 340° C., and 100% weight loss occurs up to 385°–390° C. The glass transition temperature (Tg) for poly α-methylstyrene is 167°–168° C.

Figure 4:
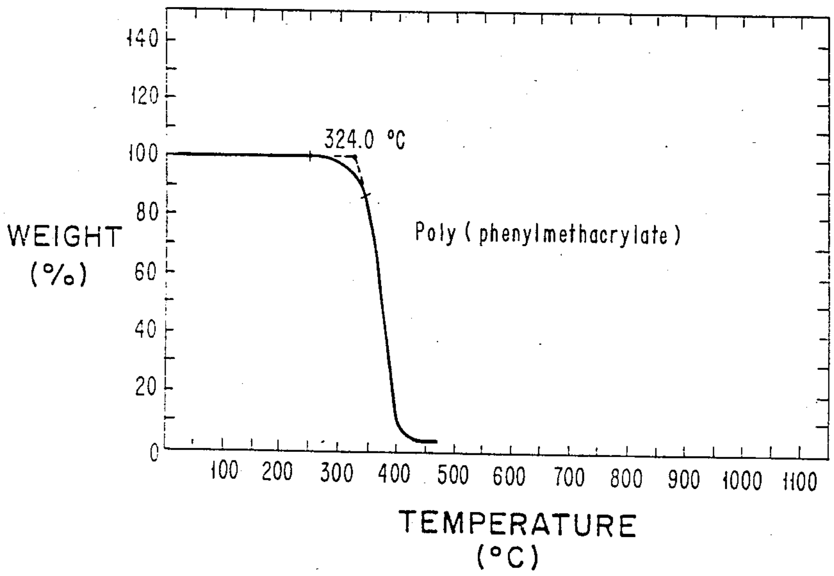
Figure 5:
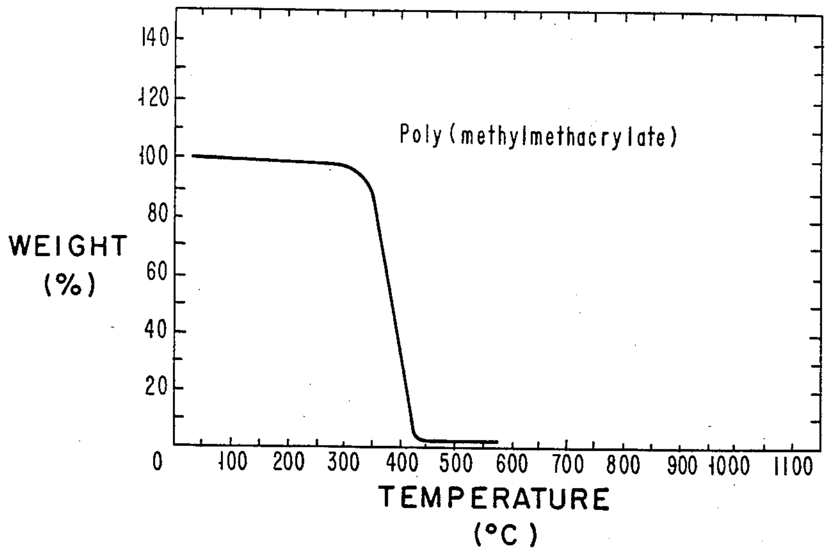
Figure 6:
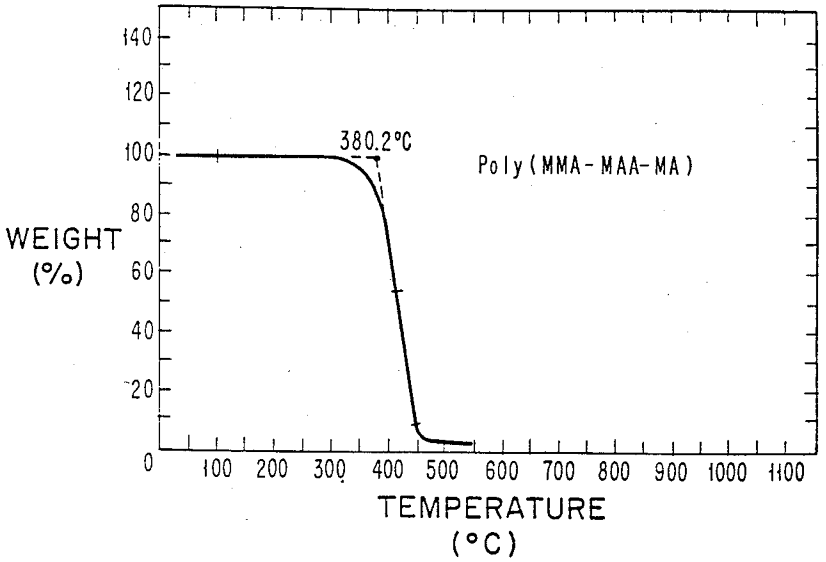

The thermal decomposition of poly(phenylmethacrylate) ($\overline{M}W=2-2.5\times10^6$) is shown in FIG. 4. This material begins to decompose at about 300° C., and then undergoes rapid weight loss reaching approximately 50% at 370° C. to substantially zero weight at approximately 450° C. The glass transition temperature (Tg) for this polymer is approximately 109° C.

The TGA curve (FIG. 5) for polymethylmethacrylate (PMMA) ($\overline{M}W$ approximately 80,000) shows that the decomposition accompanied by weight loss starts around 300° C., followed by approximately 50% loss up to 327° C. and an approximately 100% weight loss up to 450° C. Tg of PMMA is approximately 105° C.

The corresponding TGA thermogram of a terpolymer, (polyMMA-MAA-MA) poly(methylmethacrylate-methacrylicanhydride-methacrylic acid) (FIG. 6) shows that the decomposition accompanied by weight loss starts around 350° C. followed by rapid weight loss witth essentially no residue at a temperature of about 450°–460° C. The molecular weight $\overline{M}W$ of this polymer is $40-80\times10^3$.

The thermal profiles of FIGS. 3–6 were obtained in a nitrogen atmosphere. If an oxygen or air atmosphere is used, the amount of residue will be zero for these ablatable polymers.

In contrast to the ablatable materials of the present invention, conventional organic binders such as cellulosic esters (for example, cellulose-acetate butyrate (CAB), ethyl cellulose and urethane-cross-linked CAB) show much slower rates of weight loss which also start early as a function of temperature, and invariably leave some char residue. As an example, the thermal profile of CAB 553.4 (produced by Eastman Chemicals) shows an onset of initial weight loss at about 260° C., followed by continuous weight loss with temperature increase to a 10% residue at 400° C., and about 0.5% residue at 590° C.

Thus, in the practice of this invention, ablatable polymers can be used in coating compositions for the fabrication of electroerosion printing structures to eliminate "fouling" or "baking" problems due to accumulation of residue as gray cake on the edges of the electrodes used for electroerosion recording. These ablatable materials can be used in the base layer and/or in the overlayer or lubricant-protective top layer.

The classes of ablatable polymers which can be used, and examples of suitable polymers in each class, have been described. In addition to these chemical definitions (structural formulae, etc.), the ablatable polymers are chosen based on additional properties that they must possess. These properties include the following:

1. The polymers must thermally depolymerize cleanly to volatile monomers of low molecular weight, without recombination during thermal degradation.
2. Thermal degradation of these polymers must not produce toxic by-products.
3. The polymer must be compatible with other components of the electroerosion medium, and must be formable as a film.
4. These polymers must be characterized by low residue after decomposition, and by the absence of sticky by-products, etc.
5. Suitable polymers must also have a sharp, thermally-induced onset of decomposition, and a rapid decomposition to essentially zero residue.
6. The temperature at which thermal decomposition begins should be less than or about the same as that necessary for electroerosion.

Within these guidelines, one of skill in the art will be able to select additional examples of ablatable polymers which can be used in the practice of this invention.

The following representative examples illustrate the fabrication of electroerosion printing media according to this invention.

EXAMPLE I

Base Layer (12)

A coating formulation for the base layer is prepared as follows:

15.8 Parts by weight of a 20% solution (W/W) of celluloseacetate butyrate (CAB 553.4 from Eastman Kodak) in 4:1 mixture of THF-Toluene, is combined with 1.9 Parts of amorphous silica powder (1MSIL 108H from Illinois Mineral Co.) and 0.15 Parts of dispersant (R 221-75, Mobay Co.), and the mixture is ball milled for 12–16 hours. To the resulting dispersion is added 10 Parts of a 10% solution of poly α-methylstyrene ($\overline{M}W$ 533K) in 4:1 mixture of THF-toluene and ball milling is continued for another 3 hours after which 1–2 Parts of polyisocyanate (CB-75-Mobay) solution in 3 Parts of THF-toluene and 0.01 Parts of surfactant (FC 430, 3M) is added to the dispersion and stirred for 10 minutes to insure thorough mixing of all the ingredients.

This formulation is then applied onto the 2 mil thick sheet of polyester substrate (Mylar* XM 728 from E. I. duPont deNemours) using a conventional web coating apparatus, followed by solvent evaporation/drying at 95°–110° C. for 3–5 minutes to obtain a 3–6 micrometer thick coating.

*a trademark of E. I. duPont deNemours

Conductive Al Layer

Over the base layer described above is vapor-deposited a 325 Å thick Al film by the conventional vacuum metallization technique.

Use of this material for electro-erosion recording at 30–60 volts provided a high quality print medium which could be used as a "direct negative" or as an "offset master" on the printing press. The imaged area was found to be hydrophobic and ink-receptive while the unwritten area with Al surface is hydrophilic and not wettable by the oleophilic printing inks.

A further improvement in the structure described above in terms of wear resistance is obtained by the application of a protective lubricant layer comprising formulations of solid lubricants such as graphite in either the cellulosic binders as disclosed in copending U.S. patent application Ser. No. 454,743, or the thermally depolymerizable polymeric binders.

Protective Layer (16)

For protective of the conductive layer 14 against abrasion or scratching and overall improvement in the quality of the recording material, the Al film is overcoated with the following lubricant formulation as a 4–7% by weight of solids:

4–6 Parts of a 10% solution of poly α-methylstyrene ($\overline{M}W$ 553K) in 4:1 mixture of THF-toluene is combined with 9.5 Parts of a concentrated colloidal suspension containing 10% by weight of purified carbon/graphite solids (such as the product No. 211 available from Superior Graphite Co.) and ball milled for 30 min.–1 hr. The resulting dispersion is diluted with 12 parts 2.5:1 THF-toluene and thoroughly mixed using a high speed stirrer.

This composition is applied by conventional web coating technique using continuous drying cycles at 90°-100° C. for 3-10 min. to form a protective layer with thickness corresponding to 2-15 mg. coating weight per $cm^2$.

The overcoat compositions with higher organic binder content can be formed by formulating 5-10 Parts of 10% solution of poly α-methylstyrene) or alternate thermally depolymerizable polymeric systems described here into graphite or carbon suspensions.

Similar protective coating over the Al layer was formed by substituting polyphenylmethacrylate ($\overline{MW}$ $2.3\times10^6$) as a 7.5% solution in 3.5:1 THF-toluene, for poly α-methylstyrene in the above formulation. Electroerosion printing on this recording medium provided "direct negative" of excellent print quality with little accumulation of eroded debris on the printhead.

EXAMPLE II

A solution of 1.25 Parts by weight of polyphenylmethacrylate ($\overline{MW}=2.3\times10^6$) in 14.5 Parts of 6:1 mixture of THF and toluene, respectively, is combined with 0.32 parts of amorphous silica (IMSIL A 108H from Illinois Mineral Co.) and the mixture is ball-milled for 6-8 hours to form a uniform dispersion. This is diluted with 2 Parts of ethylacetate-toluene (1:1) and applied onto a 2 mil thick Mylar substrate using a conventional web coating apparatus, followed by solvent evaporation/drying at 90°-100° C. for 3-5 min. to obtain a 2-4 μm thick coating as the base layer (12). The conductive layer, typically aluminum at 300-400 Å thickness is then formed on the base layer by the conventional vacuum metallization technique.

The resulting metallized structure can be used for electroerosion recording in the production of a direct negative which can also be employed directly as an offset master on a printing press using conventional oleophilic inks and the standard water dampening ink cycle.

Protective Layer (16)

For a wear resistant and abrasion-resistant recording material, the metallized structure is provided with a protective layer comprising a solid lubricant such as graphite dispersed in polymethylmethacrylate, polyfluorobutylmethylmethacrylate, polyphenylmethacrylate or alternative thermally depolymerizable binder systems.

In a representative formulation, 50 g. Superior Graphite No. 211 is combined with 2 g. of methylmethacrylate-methacrylic acid copolymer (65:34) dissolved in 20 g. methylethylketone, and mixed using a high speed stirrer to form a homogeneous dispersion which is subsequently diluted with 4:1 MEK-toluene and applied with a conventional web coating apparatus followed by solvent evaporation drying at 100-110° C. for 3-5 min. The preferred thickness of the protective layer after the drying process is between 5-20 μg/$cm^2$, and the weight ratio of pigment to binder is in the range of 8:2 to 1:1, respectively. When employed as a recording medium using an electroerosion device at 30-60 volts an excellent quality direct negative was formed which could be used on a printing press as an offset master after removal of the protective layer with a solvent.

While the invention has been described with respect to particular embodiments thereof, it will be apparent to those of skill in the art that variations therein can be made without departing from the spriit and scope of the invention. Numerous guidelines have been given for the characteristics which the ablatable polymer must have, and it is within the skill of the art to use these guidelines and the teachings herein to determine suitable polymers other than those particularly listed. Further, the percentages of these polymers in the base layer and/or in the protective top layer can be varied. If these polymers are used as the only binders in those layers, maximum advantageous results will occur, while if these polymers are combined with other polymers in these layers, the beneficial results obtained may be less, in accordance with the relative amounts of the preferred materials and the other polymers used in those layers.

What we claim as new and desire to secure by Letters Patent is:

1. An improved electroerosion recording medium comprising a non-conductive support member, a thin layer of conductive material which is removed during electroerosion recording, and a base layer located between said support member and said thin layer of conductive material, said base layer being comprised of a thermally depolymerizable, high molecular weight polymer having a glass transition temperature greater than about 100° C. which undergoes thermally-induced, main-chain-scission during electroerosion recording to monomeric or low molecular weight species with little or no residue, where said depolymerizable polymer is selected from the group consisting of (a) polymers derived from acrylate monomers having a substituent in the 2-position of the double bond as represented by the following structure:

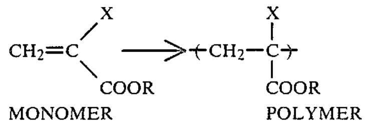

where
$X=-CH_3, -CF_3, -C_2H_5, -C_6H_5$
$R=-H, -CH_3, -CH_2CH_2CH_2CF_3, -CH_2C_6H_5, -C_2H_5, -C_6H_5$ (b) α-Substituted styrene polymers, (c) polymers derived from vinyl ketone monomers, given by the structure

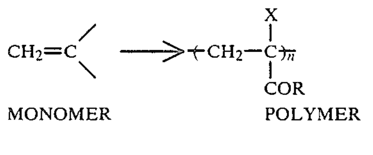

where
$X=-CH_3, -C_6H_5, -CH_2CH_3,$
$R=-CH_3, -CH_2CH_3, -C_6H_5$ (d) Polyoxymethylene.

2. The medium of claim 1, where said thin conductive layer is comprised of a metal.

3. The medium of claim 1, where said depolymerizable polymer is selected from the group consisting of polymethylmethacrylate of molecular weight greater than 80,000, polyfluorobutylmethacrylate, polyethylmethacrylate, polyphenylmethacrylate, polymethyltrifluoromethacrylate, polymethacrylic acid, polymethacrylic anhydride, methylmethacrylate-methacrylic acid copolymer, poly α-methyl styrene, methylmethacrylate-methacrylic anhydride-methacrylic acid terpolymer, poly α,β,β,-trifluorostyrene, α-methyl styrene-methylmetacrylate copolymer.

4. The electroerosion medium of claim 1, where said base layer includes a filler.

5. The electroerosion recording medium of claim 1, where said α-substituted styrene polymer is selected from the group consisting of (a) polymers derived from styrene monomers given by the structural formula

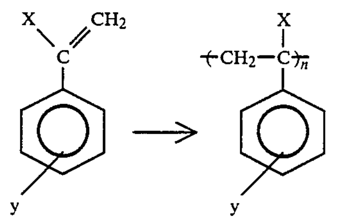

MONOMER POLYMER where
$X = -CH_3, -C_2H_5, -F, -CF_3$
$y = -H, -CH_3, -C_2H_5, -OCH_3, -OC_2H_5$, COOR ($R = -CH_3, -C_2H_5$)

(b) styrene polymers having the following structural features:

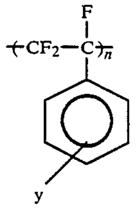

where $y = -H, -CH_3, -C_2H_5$ (c) copolymers derived from α-substituted styrenes and α-substituted acrylates represented by the structural formula

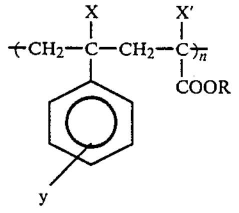

where
$X, X' = -CF_3, -CH_3, -C_2H_5$
$y = -H, -CH_3, -C_2H_5, -OC_2H_5$
$R = -CH_3, -C_2H_5, -C_6H_5$.

6. The electroerosion medium of claim 1, including a protective overlayer over said thin layer of conductive material, said protective overlayer being comprised of a depolymerizable polymer which underoges thermally-induced main-chain-scission to monomeric or low molecular weight species with little or no residue during electroerosion recording.

7. The electroerosion medium of claim 6, where said depolymerizable polymer is selected from the group consisting of:

(a) polymers derived from acrylate monomers having a substituent in the 2-position of the double bond as represented by the following structure:

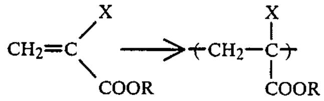

MONOMER POLYMER where
$X = -CH_3, -CF_3, -C_2H_5, -C_6H_5$
$R = -H, -CH_3, -CH_2CH_2CH_2CF_3, -CH_2C_6H_5, -C_2H_5, -C_6H_5$ (b) α-Substituted styrene polymers, (c) polymers derived from vinyl ketone monomers, given by the structure

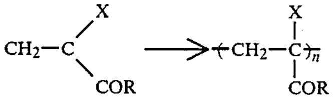

MONOMER POLYMER where
$X = -CH_3, -C_6H_5, -CH_2CH_3$,
$R = -CH_3, -CH_2CH_3, -C_6H_5$ (d) Polyoxymethylene.

8. The electroerosion medium of claim 7, where said depolymerizable polymer is selected from the group consisting of polymethylmethacrylate of molecular weight greater than 80,000, polyfluorobutylmethacrylate, polyethylmethacrylate, polymethyltrifluoromethacrylate, polyphenylmethacrylate, polymethacrylic acid, polymethacrylic anhydride, methylmethacrylate-methacrylic acid copolymer, poly α-methyl styrene, methylmethacrylatemethacrylic anhydride-methacrylic acid terpolymer, poly α,β,β,-trifluorostyrene, α-methyl styrene-methylmethacrylate copolymer.

9. The electroerosion recording medium of claim 7, where said α-substituted styrene polymer is selected from the group consisting of (a) polymers derived from styrene monomers given by the structural formula

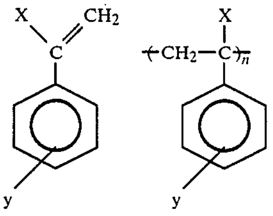

MONOMER POLYMER where
$X = -CH_3, -C_2H_5, -F, -CF_3$
$y = -H, -CH_3, -C_2H_5, -OCH_3, -OC_2H_5$, COOR ($R = -CH_3, -C_2H_5$)

(b) styrene polymers having the following structural features:

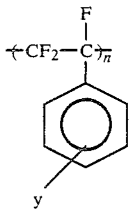

where y=—H, —$CH_3$, —$C_2H_5$ (c) copolymers derived from α-substituted styrenes and α-substituted acrylates represented by the structural formula

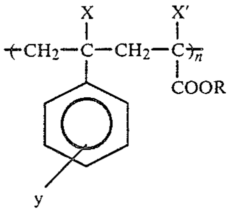

where

X, X'=—$CF_3$, —$CH_3$, —$C_2H_5$ y=—H, —$CH_3$, —$C_2H_5$, —$OC_2H_5$

R=—$CH_3$, —$C_2H_5$, —$C_6H_5$.

10. An improved electroerosion recording medium comprising a non-conductive support member, a thin layer of conductive material, and a protective overlayer for protection of said conductive material, said protective overlayer including a lubricant and a thermally depolymerizable polymer having a glass transition temperature greater than about 100° C. which undergoes thermally induced main chain scission to monomeric or low molecular weight species with little or no residue during electroerosion recording, where said depolymerizable polymer is selected from the group consisting of (a) polymers derived from acrylate monomers having a substituent in the 2-position of the double bond as represented by the following structure:

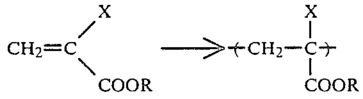

MONOMER POLYMER where

X=—$CH_3$, —$CF_3$, —$C_2H_5$, —$C_6H_5$

R=—H, —$CH_3$, —$CH_2CH_2$, $CH_2$, $CF_3$, —$CH_2C_6H_5$, —$C_2H_5$, —$C_6H_5$ (b) α-substituted styrene polymers, (c) polymers derived from vinyl ketone monomers, given by the structure

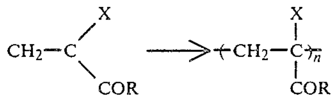

MONOMER POLYMER where

X=—$CH_3$, —$C_6H_5$, —$CH_2CH_3$,

R=—$CH_3$, —$CH_2CH_3$, —$C_6H_5$ (d) Polyoxymethylene.

11. The medium of claim 10, where said depolymerizable polymer is selected from the group consisting of polymethylmethacrylate of molecular weight greater than 80,000, polyfluorobutylmethacrylate, polyethylmethacrylate, polymethyltrifluoromethacrylate, polyphenylmethacrylate, polymethacrylic acid, polymethacrylic anhydride, methylmethacrylate-methacrylic acid copolymer, poly α-methyl styrene, methylmethacrylate-methacrylic anhydride-methacrylic acid terpolymer, poly α,β,β,-trifluorostyrene, α-methyl styrene-methylmethacrylate copolymer.

12. The medium of claim 10, where said α-substituted styrene polymer is selected from the group consisting of (a) polymers derived from styrene monomers given by the structural formula

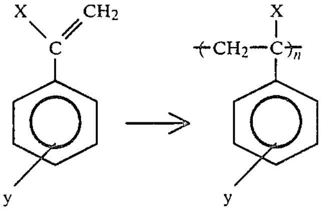

MONOMER POLYMER where

X=—$CH_3$, —$C_2H_5$, —F, —$CF_3$ y=—H, —$CH_3$, —$C_2H_5$, —$OCH_3$, —$OC_2H_5$, COOR (R=—$CH_3$, —$C_2H_5$)

(b) styrene polymers having the following structural features:

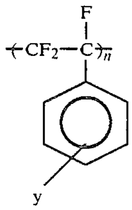

where y=—H, —$CH_3$, —$C_2H_5$ (c) copolymers derived from α-substituted styrenes and α-substituted acrylates represented by the structural formula

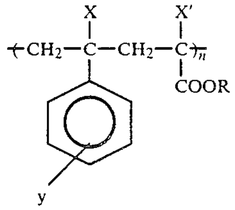

where

X, X'=—$CF_3$, —$CH_3$, —$C_2H_5$ y=—H, —$CH_3$, —$C_2H_5$, —$OC_2H_5$

R=—$CH_3$, —$C_2H_5$, —$C_6H_5$.

13. An improved electroerosion recording medium comprising a non-conductive support member, a thin layer of conductive material which is patterned during electroerosion recording, a hard polymer base layer located between said support member and said thin layer of conductive material, and an additional layer located between said thin layer and said base layer, said additional layer being comprised of a thermally depolymerizable polymer having a glass transition temperature greater than about 100° C. which undergoes thermally induced main chain scission to monomers or low molecular weight species with little or no residue during electroerosion recording, where said depolymerizable polymer is chosen from the group consisting of (a) polymers derived from acrylate monomers have a substituent in a 2-position of the double bond as represented by the following structure:

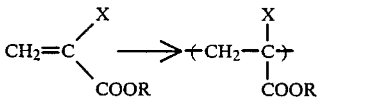

MONOMER POLYMER where
$X = -CH_3$, $-CF_3$, $-C_2H_5$, $-C_6H_5$
$R = -H$, $-CH_3$, $-CH_2CH_2CH_2CF_3$, $-CH_2C_6H_5$, $-C_2H_5$, $-C_6H_5$ (b) α-substituted styrene polymers (c) polymers derived from vinyl ketone monomers, given by the structure

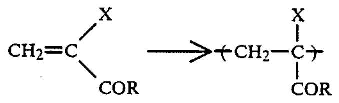

MONOMER POLYMER where
$X = -CH_3$, $-C_6H_5$, $-CH_2CH_3$,
$R = -CH_3$, $-CH_2CH_3$, $-C_6H_5$ (d) Polyoxymethylene.

14. The medium of claim 13, wherein said thin conductive layer is comprised of a metal.

15. The medium of claim 13 where said base layer is comprised of a depolymerizable polymer which undergoes thermally induced main chain scission to monomeric or low molecular weight species with little or no residue during electroerosion recording.

16. The medium of claim 13, further including a lubricant-protective layer over said thin conductive layer, said lubricant-protective layer being comprised of a depolymerizable polymer which undergoes thermally induced main chain scission to monomeric or low molecular weight species with little or no residue during electroerosion recording.

17. The medium of claim 13, wherein said α-substituted styrene polymer is selected from the group consisting of (a) polymers derived from styrene monomers given by the structural formula

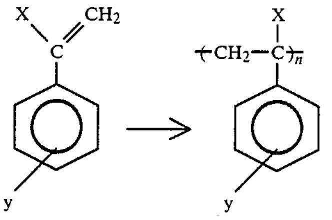

MONOMER POLYMER where
$X = -CH_3$, $-C_2H_5$, $-F$, $-CF_3$
$y = -H$, $-CH_3$, $-C_2H_5$, $-OCH_3$, $-OC_2H_5$, $COOR$ ($R = -CH_3$, $-C_2H_5$)

(b) styrene polymers having the following structural features:

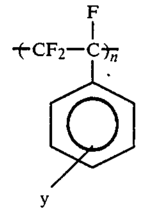

where $y = -H$, $-CH_3$, $-C_2H_5$ (c) copolymers derived from α-substituted styrenes and α-substituted acrylates represented by the structural formula

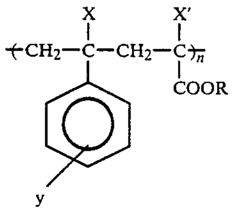

where
$X, X' = -CF_3$, $-CH_3$, $-C_2H_5$
$y = -H$, $-CH_3$, $-C_2H_5$, $-OC_2H_5$
$R = -CH_3$, $-C_2H_5$, $-C_6H_5$.

18. An improved electroerosion recording medium comprising a non-conductive support member, a thin layer of conductive material which is removed during electroerosion recording to produce a pattern therein, and a base layer located between said support member and said thin layer of conductive material, said base layer being comprised of a thermally depolymerizable polymer which is substantially ligomer-free and of high molecular weight, said polymer having a glass transition temperature in excess of about 100° C. and undergoing sudden and rapid thermally-induced, main-chain-scission during electroerosion recording to monomeric or low molecular weight species with little or no residue.

19. An improved electroerosion recording medium comprising a non-conductive support member, a thin layer of conductive material which can be electroeroded to produce a pattern therein, and a protective overlayer for protection of said conductive material, said protective overlayer including a lubricant and a thermally depolymerizable polymer which is substantially ligomer-free and of high molecular weight, said polymer having a glass transition temperature in excess of about 100° C. and undergoing sudden and rapid thermally induced main chain scission to monomeric or low molecular weight species with little or no residue during electroerosion recording.

20. An improved electroerosion recording medium comprising a non-conductive support member, a thin layer of conductive material which is patterned during electroerosion recording, a hard polymer base layer located between said support member and said thin layer of conductive material, and an additional layer located between said thin layer and said base layer, said additional layer being comprised of a thermally depolymerizable polymer which is substantially ligomer-free and of high molecular weight, said polymer having a glass transition temperature in excess of about 100° C. and undergoing abrupt and rapid thermally induced main chain scission to monomers or low molecular weight species with litle or no residue during electroerosion recording.

* * * * *